(12) United States Patent
Zheng et al.

(10) Patent No.: US 12,302,884 B2
(45) Date of Patent: *May 20, 2025

(54) MOSQUITO KILLING LAMP

(71) Applicant: NINGBO DAYANG TECHNOLOGY CO., LTD., Zhejiang (CN)

(72) Inventors: Jun Zheng, Zhejiang (CN); Yuanai Ning, Zhejiang (CN)

(73) Assignee: NINGBO DAYANG TECHNOLOGY CO., LTD., Ningbo (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,868

(22) Filed: Feb. 15, 2023

(65) Prior Publication Data
US 2023/0292727 A1    Sep. 21, 2023

(30) Foreign Application Priority Data

Mar. 21, 2022 (CN) .......................... 202220625275.4

(51) Int. Cl.
*A01M 1/04*    (2006.01)
*A01M 1/22*    (2006.01)
*F21K 9/232*   (2016.01)

(52) U.S. Cl.
CPC .............. *A01M 1/04* (2013.01); *A01M 1/223* (2013.01); *F21K 9/232* (2016.08)

(58) Field of Classification Search
CPC .......... A01M 1/04; A01M 1/223; A01M 1/08; A01M 1/22; F21K 9/232
USPC .................................................. 43/112, 113
See application file for complete search history.

(56) References Cited

U.S. PATENT DOCUMENTS

| | | | | |
|---|---|---|---|---|
| 2,061,458 A | * | 11/1936 | Folmer ................... | A01M 1/04 43/112 |
| 2,092,136 A | * | 9/1937 | Plym ....................... | A01M 1/04 43/112 |
| 2,132,371 A | * | 10/1938 | Kriwat ..................... | A01M 1/02 43/112 |
| 2,198,807 A | * | 4/1940 | Eshbaugh ............... | A01M 1/04 362/253 |
| 4,226,043 A | * | 10/1980 | Peterson ................ | A01M 1/223 43/112 |
| 4,654,998 A | * | 4/1987 | Clay ....................... | A01M 1/145 43/115 |
| 4,785,573 A | * | 11/1988 | Millard ................... | A01M 1/04 362/179 |
| 5,184,417 A | * | 2/1993 | Weldon ................. | A01M 1/106 43/107 |
| 5,301,458 A | * | 4/1994 | Deyoreo ................ | A01M 1/04 43/112 |

(Continued)

*Primary Examiner* — Tye William Abell
*Assistant Examiner* — Maria E Graber

(57) ABSTRACT

The present disclosure discloses a mosquito killing lamp including a housing, a mosquito killing assembly and a light emitting assembly; the mosquito killing assembly and the light emitting assembly are mounted on the housing; the light emitting assembly includes an illuminant, a dazzling cover, and an actuator; both of the actuator and the illuminant are mounted on the housing, and the dazzling cover is mounted on a torque output shaft of the actuator and covers the illuminant. The mosquito killing lamp not only has the functions of lighting and mosquito killing, but also has the function of entertainment, which can meet the needs of modern people.

15 Claims, 6 Drawing Sheets

(56) References Cited

U.S. PATENT DOCUMENTS

| | | | | |
|---|---|---|---|---|
| 6,134,826 A * | 10/2000 | Mah | A01M 1/223 | 43/99 |
| 8,028,467 B2 * | 10/2011 | Bagnall | A01M 1/106 | 43/107 |
| 8,390,182 B2 * | 3/2013 | Yu | F21V 3/02 | 362/625 |
| 9,028,103 B2 * | 5/2015 | Lee | F21K 9/232 | 362/294 |
| 9,657,928 B1 * | 5/2017 | Jacobson | H05B 47/19 | |
| 10,045,521 B2 * | 8/2018 | Zheng | A01M 1/04 | |
| D899,556 S * | 10/2020 | Du | A01M 1/223 | D22/123 |
| 10,905,111 B2 * | 2/2021 | Zhang | F04D 29/644 | |
| 11,064,688 B2 * | 7/2021 | Billingsley, Jr. | H05B 47/195 | |
| 11,771,073 B2 * | 10/2023 | Smith | H05B 47/125 | 43/132.1 |
| 11,796,137 B1 * | 10/2023 | Bai | F21V 29/83 | |
| 11,920,742 B1 * | 3/2024 | Zou | F21K 9/232 | |
| 2004/0159040 A1 * | 8/2004 | Chen | A01M 1/223 | 43/112 |
| 2005/0174769 A1 * | 8/2005 | Yong | F21K 9/232 | 362/249.05 |
| 2009/0100743 A1 * | 4/2009 | Prater | A01M 1/223 | 43/112 |
| 2010/0071254 A1 * | 3/2010 | Calkins | A01M 1/145 | 43/107 |
| 2010/0124061 A1 * | 5/2010 | Yen | F21K 9/232 | 362/253 |
| 2012/0049732 A1 * | 3/2012 | Chuang | F21V 29/83 | 315/32 |
| 2012/0218756 A1 * | 8/2012 | Bertram | F21K 9/60 | 362/249.02 |
| 2014/0146570 A1 * | 5/2014 | Lu | F21K 9/232 | 362/647 |
| 2014/0352200 A1 * | 12/2014 | Tremble | A01M 1/223 | 43/112 |
| 2014/0355276 A1 * | 12/2014 | Fisher | F21K 9/232 | 362/382 |
| 2016/0037602 A1 * | 2/2016 | Nicholls | F21K 9/232 | 307/64 |
| 2018/0199563 A1 * | 7/2018 | Zheng | A01M 1/106 | |
| 2020/0107534 A1 * | 4/2020 | Zheng | A01M 1/08 | |
| 2021/0153493 A1 * | 5/2021 | Zhang | A01M 1/08 | |
| 2022/0248654 A1 * | 8/2022 | Howland | A01M 1/08 | |
| 2023/0292728 A1 * | 9/2023 | Zheng | A01M 1/04 | 43/112 |
| 2023/0292731 A1 * | 9/2023 | Zheng | F21V 3/049 | 43/112 |
| 2023/0309538 A1 * | 10/2023 | Marcucci | A01M 1/223 | 43/114 |

* cited by examiner

MOSQUITO KILLING LAMP

CROSS-REFERENCE TO RELATED APPLICATIONS

The present disclosure claims priority of Chinese Utility Model Application No. 202220625275.4, filed on Mar. 21, 2022, the entire contents of which are hereby incorporated by reference.

TECHNICAL FIELD

The invention relates to the technical field of lamps, and more particularly to a mosquito killing lamp.

DESCRIPTION OF THE PRIOR ART

Due to insects, mosquitoes and other flying insects' phototaxis, the flying insects tend to congregate the place where there is light. To avoid mosquito bites and gathering of flying insects, various mosquito killing fixtures have been developed. For example, mosquito killing lamps. However, the mosquito killing lamps in the prior art are simple in construction and have a single function, which cannot meet the needs of modern people.

SUMMARY OF THE DISCLOSURE

The technical problem to be solved by the present disclosure is to provide a mosquito killing lamp having a recreational function in addition to functions of lighting and mosquito killing, which meets the needs of modern people.

A technical solution of the present disclosure is to provide a mosquito killing lamp including a housing, a mosquito killing assembly and a light emitting assembly, and each of the mosquito killing assembly and the light emitting assembly is mounted on the housing. The light emitting assembly comprises an illuminant, a dazzling cover, and an actuator, both of the actuator and the illuminant are mounted on the housing, and the dazzling cover is mounted on a torque output shaft of the actuator and covers the illuminant. The light emitted by the illuminant is refracted by the dazzling cover to produce a dazzling effect.

Compared to the prior art, the mosquito killing lamp having the above structure of the present disclosure, has the following advantages that:

The mosquito killing lamp of the present disclosure includes a dazzling cover and an actuator capable of driving the dazzling cover to rotate, and the light emitted by the illuminant is refracted by the dazzling cover to produce a dazzling effect, such that the mosquito killing lamp has not only the functions of lighting and mosquito killing, but also the function of recreation, which meets the needs of modern people.

As a development, one end of the housing is provided with a connecting base on which both of the actuator and the illuminant are fixedly mounted. Such structure is simple and easy to assemble.

As a development, a mounting hole is provided in the connecting base, the actuator is embedded in the mounting hole, the illuminant comprises a substrate fixedly connected to the connecting base, and the torque output shaft of the actuator passes through the substrate and is exposed out of the illuminant; a central portion of the dazzling cover is fixedly connected to an end of the torque output shaft and the dazzling cover covers the connecting base. Such structure is simple and easy to assemble.

As a development, at least two connecting columns are provided on one side of the connecting base closest to the illuminant, the actuator is provided with fitting holes a number of which is the same as a number of the connecting columns, and the actuator is mounted around the connecting columns; and the substrate presses on an outside of the actuator and the substrate is fixedly connected to the connecting columns. With such a structure, the mounting structure of the actuator and the substrate is simple and convenient to assemble.

As a development, an inner side of the connecting base is provided with a semicircular ring-shaped supporting member, a cross-section of the supporting member is L-shaped, the supporting member comprises a semicircular ring-shaped sidewall and a semicircular ring-shaped limiting plate connected to an inner side of one end of the semicircular ring-shaped sidewall, and another end of the semicircular ring-shaped sidewall is connected to an inner side of the connecting base; a sidewall of the actuator is provided with a step abutting against the semicircular ring-shaped limiting plate. With this configuration, the semicircular ring-shaped limiting plate has a finite effect on the actuator, which is simple and reliable.

As a development, the semicircular ring-shaped limiting plate is provided with an avoidance notch. With such a configuration, the limiting convex edge with semicircular ring-shaped configuration can support the actuator as well as facilitate the connection of the actuator to a circuit.

As a development, the mounting hole is eccentrically disposed on the connecting base; the torque output shaft is eccentrically disposed on the actuator; the torque output shaft is mounted coaxially with the connecting base. With such a configuration, the actuator can be installed in a way that makes good use of space, which makes the finishing structure more compact.

As a development, the actuator is provided with a shaft sleeve, the torque output shaft passes through the shaft sleeve and is exposed out of the actuator; a central part of the substrate is provided with a central hole, and the substrate surrounds the shaft sleeve. With such a configuration, a simpler mating structure is formed between the substrate and the actuator, and the substrate and the actuator have a more reliable connection.

As a development, the illuminant further comprises a plurality of light emitting members, the substrate is provided with a lighting control circuit, the plurality of light emitting members are annularly arranged at a periphery of the substrate, the light emitting members are electrically connected to the lighting control circuit. With such a configuration, the light emitting members are more uniformly arranged on the substrate and the dazzling effect is better.

As a development, the mosquito killing assembly is disposed within the housing, the mounting hole communicates with an internal cavity of the housing; a plurality of through holes are provided on a sidewall of the housing, the through holes communicate with the internal cavity of the housing. With such a configuration, the mosquito killing assembly is mounted within the housing and the structure is more rationally designed.

As a development, a supporting column is provided within the housing; the mosquito killing assembly comprises an electrical mesh and a mosquito killing control board; the electrical mesh is wrapped around the supporting column, and the electrical mesh is electrically connected to the mosquito killing control board. With such a configuration, the electrical mesh may kill mosquitoes more effectively.

As a development, the mosquito killing assembly comprises a mosquito attracting lamp disposed within the supporting column, the supporting column is made of a transparent material. With such a configuration, the mosquito killing assembly is more effective in mosquito eradicating due to the mosquito attraction effect of the mosquito attracting lamp.

As a development, the dazzling cover is provided with a plurality of polygonal patterns. With such a configuration, there is a better dazzling effect due to the polygonal patterns.

As a development, the polygonal patterns are disposed an inner surface of the dazzling cover and an outer surface of the dazzling cover is smooth. With such a configuration, the dazzling cover has a smoother outer surface, a better visual effect, and a better dazzling effect.

As a development, the dazzling cover is hemispherical shaped. Such a configuration is a more rational design.

Figure 1:
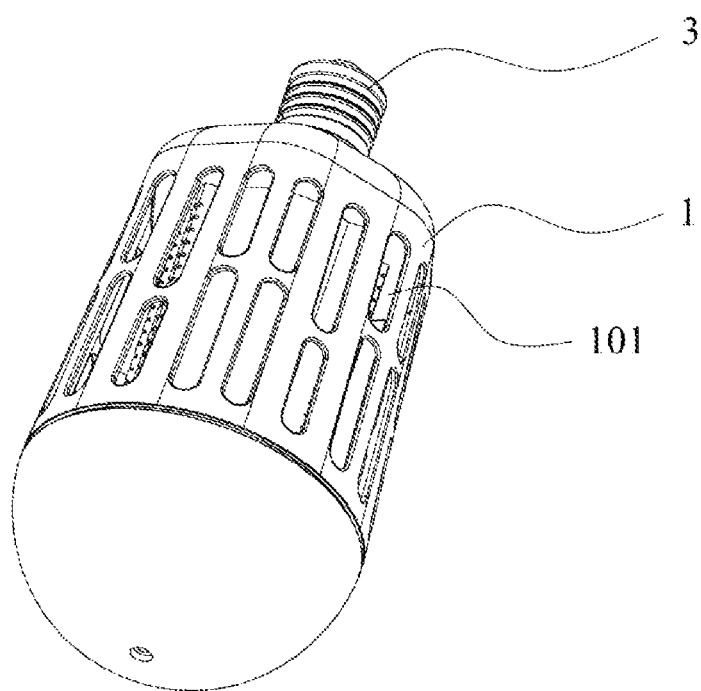
FIG. 1 is a schematic perspective view of the mosquito killing lamp of the present disclosure.

The reference numbers shown in the figures are: 1 housing, 101 through hole, 2 connecting base, 201 mounting hole, 202 connecting column, 203 routing hole, 3 connector, 4 illuminant, 401 substrate, 402 light emitting member, 403 central hole, 404 first connecting hole, 5 dazzling cover, 501 polygonal pattern, 6 actuator, 601 motor, 602 gearbox, 603 torque output shaft, 604 shaft sleeve, 605 step, 606 lug, 607 fitting hole, 7 supporting member, 701 semicircular ring-shaped sidewall, 702 semicircular ring-shaped limiting plate, 703 avoidance notch, 8 mosquito attracting lamp, 9 mosquito killing control board, 10 supporting column, 1001 rib, 1002 groove, 1003 second connecting hole, 11 annular supporting plate.

DESCRIPTION OF EMBODIMENTS

For a better understanding of the present disclosure, various aspects of the present disclosure will be explained in more detail with reference to the accompanying drawings. It is to be understood that these detailed descriptions are only illustrative of exemplary embodiments of the present disclosure and are not intended to limit the scope of the present disclosure in any way. The reference numerals refer to the same elements throughout the description.

In the drawings, the thickness, size, and shape of objects have been slightly enlarged for ease of illustration. The drawings are merely examples and are not drawn strictly to scale.

It will be further understood that the terms "includes," "including," "having," "comprises," and/or "comprising," when used in this specification, specify the presence of stated features, integers, steps, operations, elements, and/or components, but do not exclude the presence or addition of one or more other features, integers, steps, operations, elements, components, and/or combination thereof.

Figure 2:
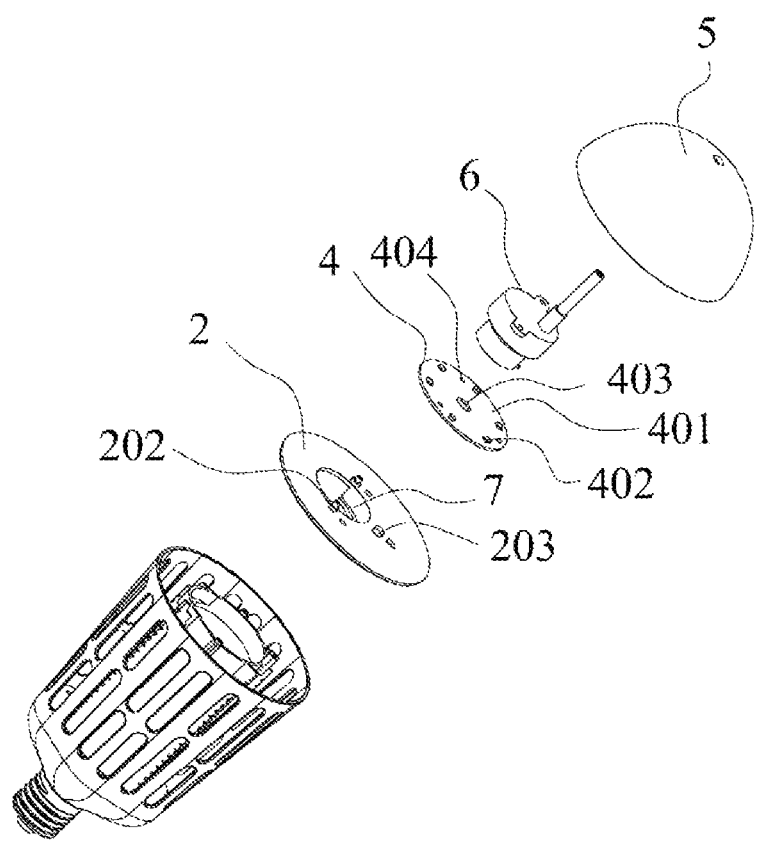
FIG. 2 is a schematic exploded view of the mosquito killing lamp of the present disclosure.

As shown in FIGS. 1-2, the present disclosure discloses a mosquito killing lamp including a housing 1, a mosquito killing assembly, and a light emitting assembly.

Each of both ends of the housing 1 is provided an opening, the opening at one end of the housing 1 is larger than the opening at the other end of the housing 1. One end of the housing 1 is provided with a connecting base 2 therein, and the connecting base 2 is substantially in the form of a plate. The other end of the housing 1 is provided with a connector 3, and the connector 3 is configured to be connected to a lamp base such that the mosquito killing lamp can get power therefrom.

The lighting assembly includes an illuminant 4, a dazzling cover 5 and an actuator 6. The illuminant 4 includes a substrate 401 and a plurality of light emitting members 402, and the substrate 401 is provided with a lighting control circuit. The plurality of light emitting members 402 are annularly arranged at a periphery of the substrate 401, the light emitting members 402 are electrically connected to the lighting control circuit. The light emitting members 402 are LEDs, and the LEDs are controlled by the circuit to emit light of different colors. The actuator 6 includes a motor 601 and a gearbox 602, and the motor 601 and the gearbox 602 are integrated. An input end of the gearbox 602 is connected to an output shaft of the motor 601, and an output end of the gearbox 602 is connected to a torque output shaft 603. The output shaft of the gearbox 602 is provided with a shaft sleeve 604, and the torque output shaft 603 passes through the shaft sleeve 604 and is exposed out of the shaft sleeve 604. A step 605 is provided on a sidewall of the actuator 6 and is located on a connection position of the motor 601 to the gearbox 602.

Figure 3:
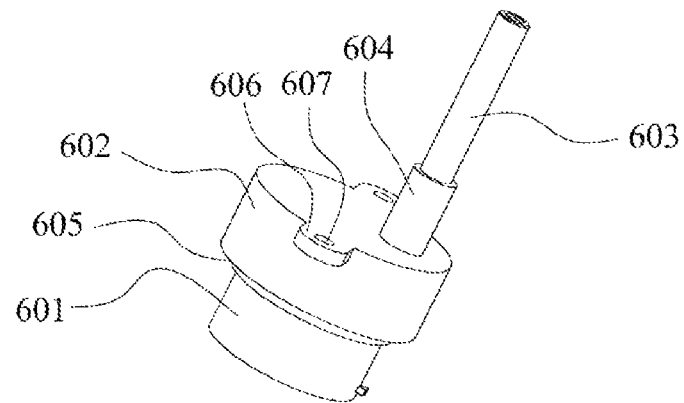
FIG. 3 is a schematic perspective view of the actuator of the mosquito killing lamp of the present disclosure.
Figure 4:
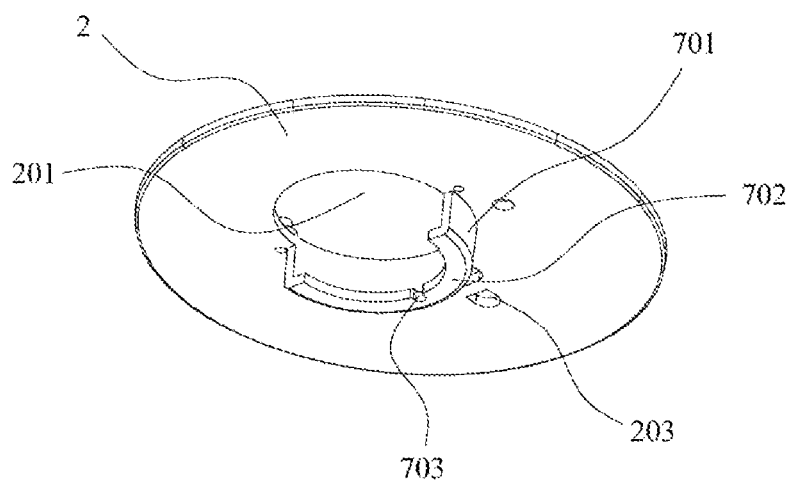
FIG. 4 is a schematic perspective view of the connecting base of the mosquito killing lamp of the present disclosure.
Figure 5:
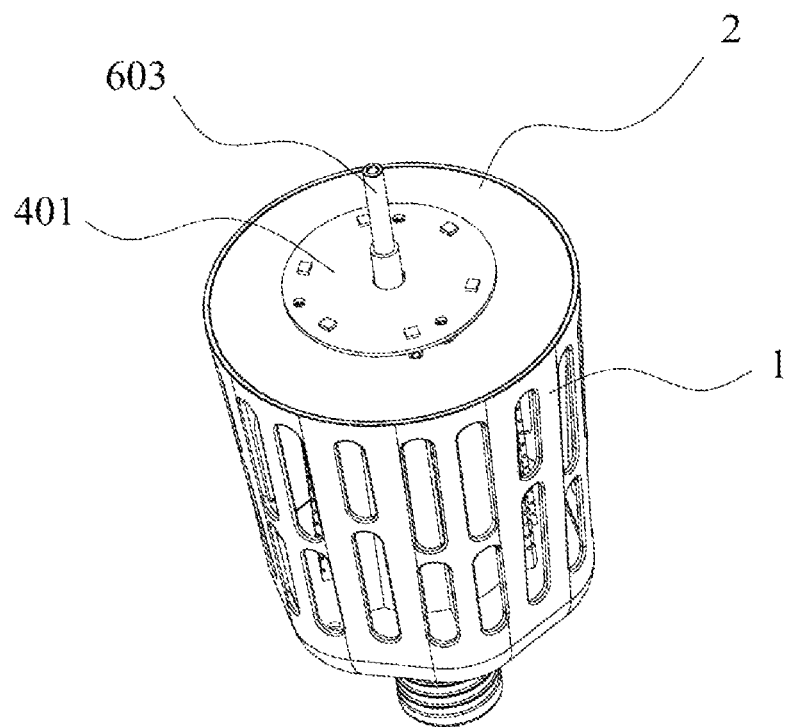
FIG. 5 is a schematic partial perspective view of the mosquito killing lamp of the present disclosure.

As shown in FIGS. 3-5, the connecting base 2 is provided with a mounting hole 201, and the mounting hole 201 communicates with an internal cavity of the housing 1. The mounting hole 201 is shaped to fit with the shape of the gearbox 602 of the actuator 6 and is eccentrically disposed on the connecting base 2. In this embodiment, the mounting hole 201 is circular. An inner side of the connecting base 2 is provided with a semicircular ring-shaped supporting member 7, and the supporting member 7 has an L-shaped cross-section. The supporting member 7 includes a semicircular ring-shaped sidewall 701 and a semicircular ring-shaped limiting plate 702. The semicircular ring-shaped limiting plate 702 is attached on to an inner side of one end of the semicircular ring-shaped sidewall 701, another end of the semicircular ring-shaped sidewall 701 is attached onto an inner side of the connecting base 2. The semicircular ring-shaped limiting plate 702 is provided with an avoidance notch 703.

The actuator 6 is embedded in the mounting hole 201 and the supporting member 7, a portion of the actuator 6 corresponding to the motor 601 passes through the mounting hole 201 and the supporting member 7 is exposed out of the supporting member 7. A contact on the sidewall of the actuator 6 pass through the avoidance notches 703. The step 605 of the actuator 6 abuts against the semicircular ring-shaped limiting plate 702. At least two connecting columns 202 are provided on an outer side of the connecting base 2, the connecting columns 202 are arranged on a periphery of the mounting holes 201. The sidewall of the actuator 6 are provided with lugs 606 corresponding to the connecting columns 202, each of the lugs is provide with a fitting hole 607. In this embodiment, two connecting columns 202 are provide and two lugs are provided. The lugs 606 disposed on the actuator 6 are mounted around the connecting columns 202. The torque output shaft 603 of the actuator 6 is mounted coaxially with the connecting base 2, that is, the torque output shaft 603 is coaxial with the connecting base 2. A central part of the substrate 402 is provide with a central hole 403, and the substrate 402 surrounds the shaft sleeve 604 of the actuator 6 and presses on an outer side of the actuator 6. The substrate 401 is provided with first connecting holes 404 which are positioned corresponding to the connecting columns 202, each connecting hole 404 and a threaded hole of each connecting column 202 are passed through by a screw to fixedly connect the substrate 401 to the connecting column 202.

Figure 6:
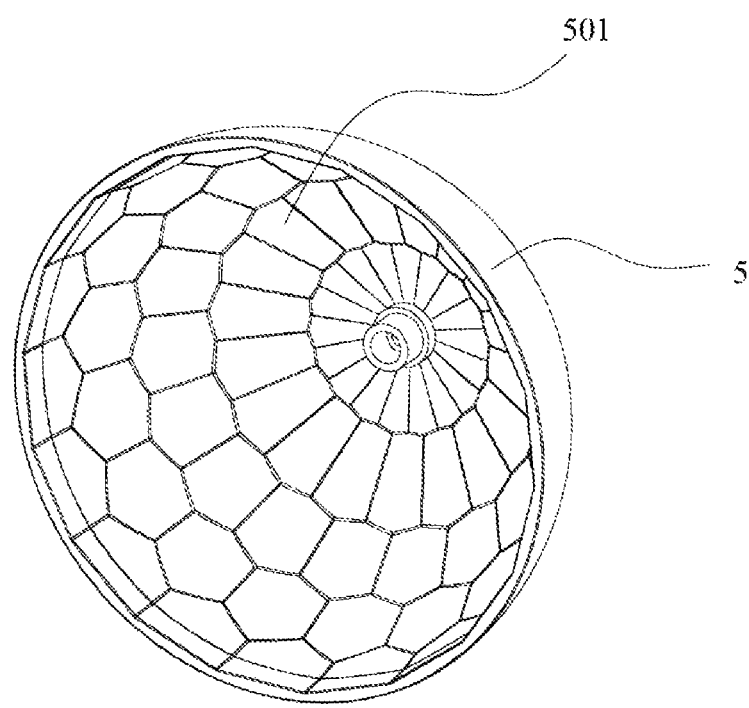
FIG. 6 is a schematic perspective view of the dazzling cover of the mosquito killing lamp of the present disclosure.

As shown in FIG. 6, the dazzling cover 5 is hemispherical shaped, an inner surface of the dazzling cover 5 is provided with a plurality of polygonal patterns 501, the polygonal patterns are arranged in sequence from the central part to a periphery of the dazzling cover 5 and form loops, each loop is formed by a plurality of polygonal patterns 501 connected end to end along a circumferential direction. The outer surface of the dazzling cover 5 is smooth. The central part of the dazzling cover 5 is fixedly connected to one end of the torque output shaft 603, and the dazzling cover 5 covers the connecting base 2 and the illuminant 4. The light emitted by the light emitting members 402 is refracted by the dazzling cover 5 to produce a dazzling effect.

Figure 7:
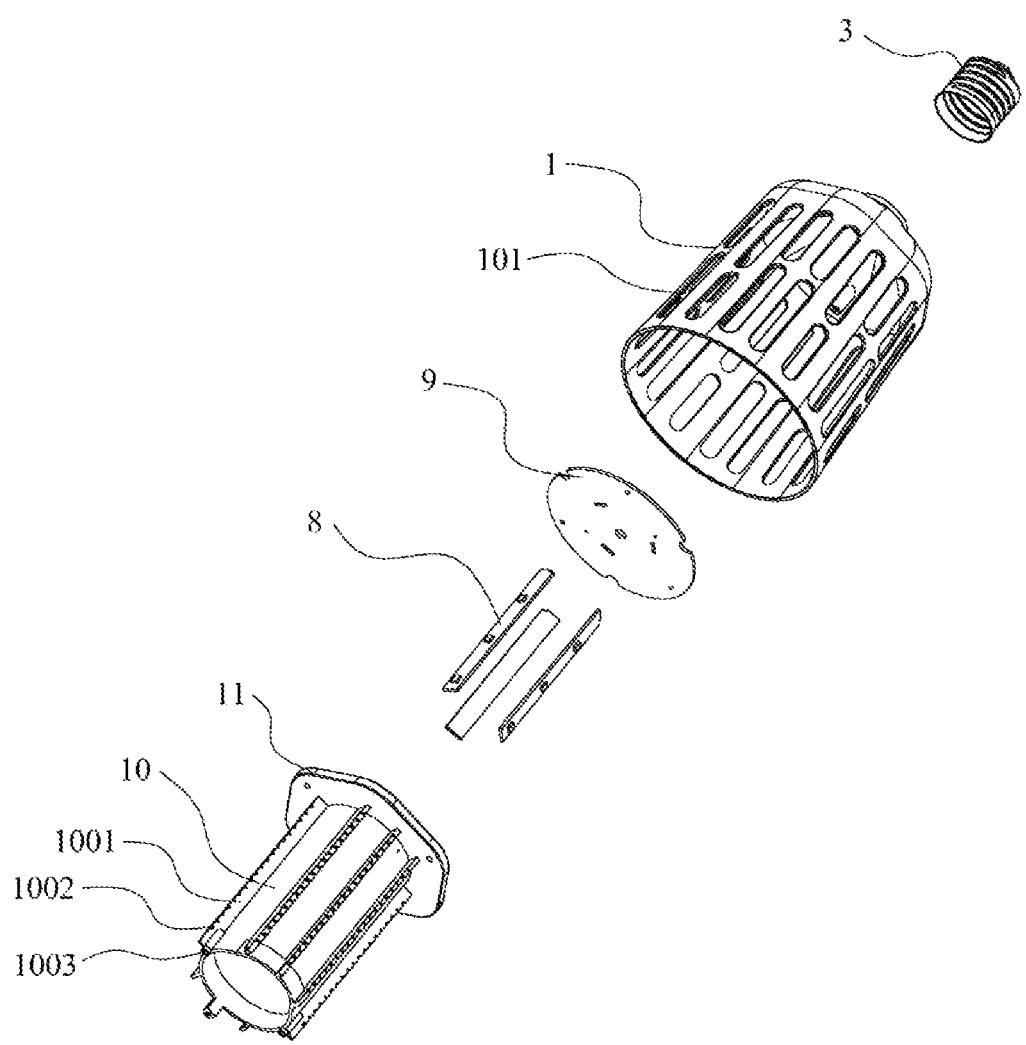
FIG. 7 is a schematic partially exploded view of the mosquito killing lamp of the present disclosure.

As shown in FIG. 7, the mosquito killing assembly includes an electrical mesh, a mosquito attracting lamp 8 and a mosquito killing control board 9. A hollow supporting column 10 is provided within the housing 1, and the hollow supporting column 10 is made of transparent material. A plurality of through holes 101 are provided in the sidewall of the housing 1, and the through holes 101 communicate with the internal cavity of the housing 1. One end of the supporting column 10 adjacent to the connector 3 is provided with an annular supporting plate 11, and the mosquito killing control board 9 is fixedly mounted on the annular supporting plate 11, and the annular supporting plate 11 is fixedly connected to an inner wall of the housing 1. A plurality of ribs 1001 are disposed on a sidewall of the supporting column 10 and are arranged circumferentially along the supporting column 10, each of the ribs 1001 is provided with a plurality of grooves 1002 along a length direction of the ribs 1001, the electrical mesh is wrapped around the ribs 1001, and the electrical mesh is electrically connected to the mosquito killing control board 9. A mosquito attracting lamp 8 is mounted in the supporting column 10, the mosquito attracting lamp 8 is connected to the mosquito killing control plate 9. An end surface of the supporting column 10 which is close to one end of the connecting base 2 is provided with second connecting holes 1003 which are positioned corresponding to the first connecting holes 404, and an end of a screw fixing the substrate 401 passes through the threaded hole and is further connected to the second connecting hole 1003, so that the connecting base 2 can be fixedly connected to the supporting column 10, the connecting base 2 has a simple mounting construction.

The connecting base 2 is also provided with a routing hole 203 configured for passage of wires of the lighting control circuit.

The lighting control circuit, the actuator 6 and the mosquito killing control board 9 are electrically connected to the connector 3. The lighting control circuit is capable of controlling the illuminant 4 to emit light, and the dazzling cover 5 can make the light emitted by the illuminant 4 produce a dazzling effect. The mosquito killing control board 9 controls the electrical mesh to power on and controls the mosquito attracting lamp 8 to turn on.

The invention claimed is:

1. A mosquito killing lamp comprising:
    a housing;
    a mosquito killing assembly; and
    a light emitting assembly,
    wherein each of the mosquito killing assembly and the light emitting assembly being mounted on the housing; and
    wherein the light emitting assembly comprises:
        an illuminant;
        a dazzling cover; and
        an actuator,
        wherein both of the actuator and the illuminant are mounted on the housing, and the dazzling cover is mounted on a torque output shaft of the actuator and covers the illuminant.

2. The mosquito killing lamp according to claim 1, wherein one end of the housing is provided with a connecting base on which both of the actuator and the illuminant are fixedly mounted.

3. The mosquito killing lamp according to claim 2, wherein a mounting hole is provided in the connecting base, the actuator is embedded in the mounting hole, the illuminant comprises a substrate fixedly connected to the connecting base, and the torque output shaft of the actuator passes through the substrate and is exposed out of the illuminant; a central portion of the dazzling cover is fixedly connected to an end of the torque output shaft and the dazzling cover covers the connecting base.

4. The mosquito killing lamp according to claim 3, wherein at least two connecting columns are provided on one side of the connecting base closest to the illuminant, the actuator is provided with fitting holes, a number of which is the same as a number of the connecting columns, and the actuator is mounted around the connecting columns; and the substrate presses on an outside of the actuator and the substrate is fixedly connected to the connecting columns.

5. The mosquito killing lamp according to claim 3, wherein the illuminant further comprises a plurality of light emitting members, the substrate is provided with a lighting control circuit, the plurality of light emitting members are annularly arranged at a periphery of the substrate, the light emitting members are electrically connected to the lighting control circuit.

6. The mosquito killing lamp according to claim 3, wherein an inner side of the connecting base is provided with a semicircular ring-shaped supporting member, a cross-section of the supporting member is L-shaped, the supporting member comprises a semicircular ring-shaped sidewall and a semicircular ring-shaped limiting plate connected to an inner side of one end of the semicircular ring-shaped sidewall, and another end of the semicircular ring-shaped sidewall is connected to an inner side of the connecting base; a sidewall of the actuator is provided with a step abutting against the semicircular ring-shaped limiting plate.

7. The mosquito killing lamp according to claim 6, wherein the semicircular ring-shaped limiting plate is provided with an avoidance notch.

8. The mosquito killing lamp according to claim 3, wherein the mounting hole is eccentrically disposed on the connecting base; the torque output shaft is eccentrically disposed on the actuator; and the torque output shaft is mounted coaxially with the connecting base.

9. The mosquito killing lamp according to claim 8, wherein the actuator is provided with a shaft sleeve, the torque output shaft passes through the shaft sleeve and is exposed out of the actuator; a central part of the substrate is provided with a central hole, and the substrate surrounds the shaft sleeve.

10. The mosquito killing lamp according to claim 3, wherein the mosquito killing assembly is disposed within the housing, the mounting hole communicates with an internal cavity of the housing; a plurality of through holes are provided on a sidewall of the housing, the through holes communicate with the internal cavity of the housing.

11. The mosquito killing lamp according to claim 10, wherein a supporting column is provided within the housing; the mosquito killing assembly comprises an electrical mesh and a mosquito killing control board; the electrical mesh is wrapped around the supporting column, and the electrical mesh is electrically connected to the mosquito killing control board.

12. The mosquito killing lamp according to claim 11, wherein the mosquito killing assembly comprises a mosquito attracting lamp disposed within the supporting column, the supporting column is made of a transparent material.

13. The mosquito killing lamp according to claim 1, wherein the dazzling cover is provided with a plurality of polygonal patterns.

14. The mosquito killing lamp according to claim 13, the polygonal patterns are disposed on an inner surface of the dazzling cover and an outer surface of the dazzling cover is smooth.

15. The mosquito killing lamp according to claim 13, wherein the dazzling cover is hemispherically shaped.

\* \* \* \* \*